Figure 1:
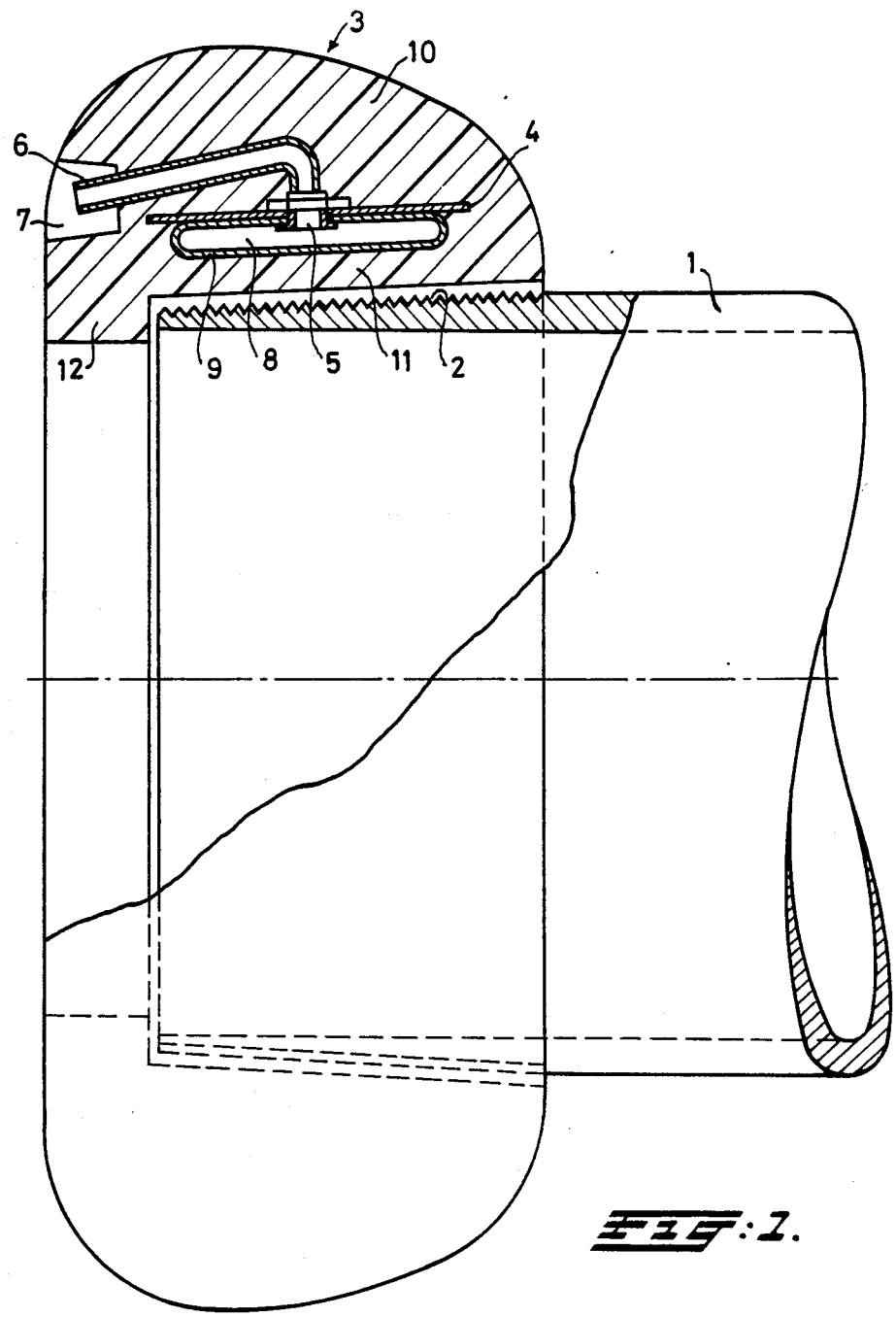

United States Patent [19]

Budde

[11] Patent Number: 4,854,350

[45] Date of Patent: Aug. 8, 1989

[54] PIPE-END PROTECTOR

[76] Inventor: Peter Budde, Waterleidingstraat 1, 3134 KC Vlaardingen, Netherlands

[21] Appl. No.: 83,784

[22] PCT Filed: Nov. 19, 1986

[86] PCT No.: PCT/NL86/00040

§ 371 Date: Aug. 21, 1987

§ 102(e) Date: Aug. 21, 1987

[87] PCT Pub. No.: WO87/03270

PCT Pub. Date: Jun. 4, 1987

[30] Foreign Application Priority Data

Nov. 21, 1985 [NL] Netherlands ............................ 8503211

[51] Int. Cl.⁴ ............................................. B65D 59/06
[52] U.S. Cl. .................................. 138/96 R; 138/96 T
[58] Field of Search ...................... 138/89, 96 R, 96 T, 138/93, 97, 99, 110

[56] References Cited

U.S. PATENT DOCUMENTS

| 1,710,439 | 4/1929 | Taylor ..................................... 138/93 |
| 2,559,564 | 7/1951 | Sperling .................................. 138/93 |
| 2,725,898 | 12/1955 | Stansbury ............................ 138/96 T |
| 2,745,438 | 5/1956 | Bloom .................................... 138/96 T |
| 4,173,988 | 11/1979 | Fowler .................................. 138/96 T |
| 4,202,379 | 5/1980 | Vetter ...................................... 138/97 |

FOREIGN PATENT DOCUMENTS

WO87270  6/1987  World Int. Prop. O. ........ 138/96 T

Primary Examiner—James E. Bryant, III
Attorney, Agent, or Firm—Beehler & Pavitt

[57] ABSTRACT

A pipe-end protector has a unitary body (3) bored for accommodating the pipe-end (1) to be protected and having an interior cavity connected through a one-way valve and a filling duct (6) with an exteriorly accessible filling connection, a metal ring (4) preventing the outwards expansion of the body (3) made of an elastic and strong plastic material. The metal ring (4) is a closed ring completely embedded in the plastic and sufficiently flexible for following elastic deformation of the plastic body, the body portion (10) outside said ring (4) having a sufficient thickness for providing elastic thrust protection, an expansion cavity (8) being defined by the inner wall of the ring (4), the filling duct (6) being situated in a depression (7) formed in an end face (11) of the body (3).

7 Claims, 2 Drawing Sheets

U.S. Patent  Aug. 8, 1989  Sheet 1 of 2  4,854,350

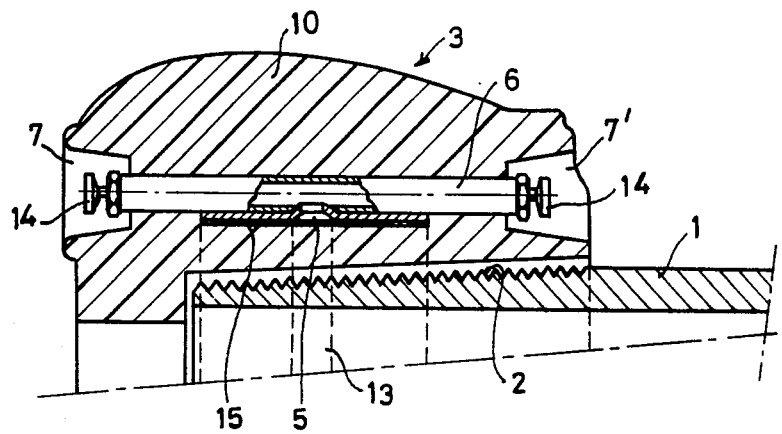
FIG: 2.
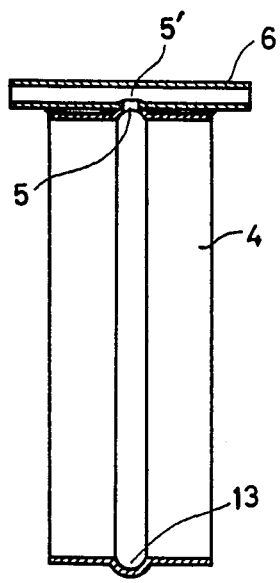
FIG: 3.

PIPE-END PROTECTOR

For protecting pipes, intended for drilling oil or gas wells, pipe-end protectors are known by means of which the outer screw thread of said pipes can be protected against being damaged.

Nearly all pipe-end protectors are provided with mechanical tensioning means included in a plastics body, by means of which the inner wall of said body can be clamped on a pipe-end by turning over a toggle handle. Such protectors operate satisfactorily as such, but have the objection that the clamping means have to be frequently readjusted for assuring a good clamping effect, and moreover said means can often be irreparably damaged as a consequence of the occurring substantial thrust forces. The life of such protectors is, therefore, short, which is objectionable in view of the relatively high price thereof.

Pipe-end protectors have already been proposed which consist of a plastics body provided with a bore for accommodating the pipe-end to be protected, and having an interior cavity connecting, by means of a filling duct, with a filling connection which is accessible from the outside and is provided with a one-way valve, in order to clamp, by means of a pressure rise inside said cavity, the wall of the bore of said body against the pipe-end, a metal ring preventing the outward expansion of said body.

Since, when drilling, compressed air of about 0.9 MPa is always available, applying such protectors is very simple, and by pressing inwards the one-way valve or by actuating a separate depressurizing valve, the internal pressure can be quickly relieved for removing the protectors.

Said known pipe-end protectors have, however, such draw-backs that they have hardly been put into use. The metal protection rings are generally provided at the outside, and should have such a strength as to withstand transverse thrust loads, but in the case of very heavy thrusts such a ring can be indented making the protector useless. In some protectors the filling connection is provided in the outer wall, so that on deformation of the ring the filling connection can be damaged, or leakage can occur in other ways. If the filling aperture is provided at the inner side of the body, there is a risk that, when bumping against the end face, the filling duct will be sheared off by the shifting pipe, and leakage will occur. Apart from the fact that the protector is made useless thereby, the protector coming off will fall downwards if the pipe is situated at a substantial height, which is dangerous to the life of the drilling operators. Moreover there is the risk that by the protector coming off untimely, the screw thread of the pipe will be damaged.

This is the reason why said pipe-end protectors based on a correct and practical insight have not found the expected application, so that only the much less practical protectors with mechanical tensioning means are still in use.

It is an object of the invention to provide a pipe-end protector of the above-mentioned kind which does not show said draw-backs, which is characterised in that said body consists of one piece of an elastic and strong plastics material, in particular a polymeric material such as polyurethane, in that the metal ring is a closed ring completely embedded in the plastics and being sufficiently flexible for following elastic deformations of the plastics body, the body portion outside said ring having a sufficient thickness for providing an elastic thrust protection, in that the expansion cavity is defined by the inner wall of said ring, in that the filling duct is situated at the outer side of said ring and communicates, by means of an opening in said ring, with said cavity, and in that the filling connection for said duct provided with said one-way valve is situated in a depression formed in an end face of said body.

The flexible ring serves only for providing the outer definition of the pressure cavity and for counteracting an outward expansion of said body. The part of the plastics body situated outside the ring provides the required protection, and the assembly of the elastic plastics and the flexible ring can yield to a thrust, after which the ring, as a consequence of its own elasticity and that of the plastics material, can return to the original shape. The filling duct is situated outside said ring, and is protected against damage by the surrounding plastics, the longitudinal forces exerted by the pipe placed within the protector not leading to damaging said duct. Arranging the filling connection in the end face improves the accessibility thereof, and provides, moreover, a sufficient protection against the occurring thrust loads.

In particular said body is provided, near one end face, of an inward collar, the end face of the pipe to be protected engaging said collar and being protected thereby. In the case of excessively large longitudinal forces only said collar will be damaged, but the air portion providing the clamping will remain undamaged, so that the protector will not get loose from the pipe and will continue to protect the screw thread of the pipe.

The used plastics material, in particular a polymer such as polyurethane, has such a strength that, even if there is no pipe present in the bore, the normal filling pressure can be withstood.

In a simple and effective embodiment of said protector, the filling duct is a tube extending between both end faces of the body, which is welded to the metal ring, and communicates by means of a transversal bore with the opening in said ring, said tube being, in particular, a throughgoing pipe which, at both ends, is or can be provided with a filling connection with a one-way valve.

In order to obtain a correct delimitation of the filling cavity which allows to use a particularly favourable manufacturing method, preferably the metal ring is provided, substantially in its central part, with a circumferential bulge in which the opening communicating with the filling duct is situated, and, moreover, the plastics material of said body is preferably adhered to the outer wall of said ring.

The invention provides, moreover, a method for manufacturing a protector of the above-mentioned kind, which is characterised in that the ring is fixed by means of the filling duct in a centered manner in a casting mould, in that the communication opening of the filling duct is covered, said filling duct, at its free extremity, being kept in communication with the ambient air, and in that, thereafter, the ingredients for forming the plastics body are introduced into said mould. Said casting mould can be a simple two-part self-releasing mould, since no filling elements are to be provided, said filling duct ensuring that the ring is kept centered in the correct way without additional distance pieces for being embedded coaxially into the plastics body to be formed. Since the filling duct remains in communication with the ambient air, it is prevented that, because of expansion of the air as a consequence of the occurring temperature rise, an irregular filling cavity would be formed in the plastics material.

The outer surface of the ring will preferably be pretreated in order to enhance the adhesion of the plastics material, so that the ring will be firmly united with the plastics, whereas the inner surface thereof is not pretreated and will be allowed to break away from said ring when appying pressure.

In order to prevent, when using a bulged ring, that said bulge is filled with plastics, said bulge is initially spanned by foil material using a suitable adhesive.

The invention will be elucidated below in more detail by reference to a drawing, showing in:

FIG. 1 a diagrammatical cross-section, partly in side view, of a pipe-end protector of the invention arranged at a pipe-end;

FIG. 2 a partial cross-section of a second embodiment of the pipe-end protector of the invention; and FIG. 3 a cross-section of a part of the pipe-end protector of FIG. 2.

In FIG. 1 a terminal portion of a pipe 1 with external screw thread 2 is shown. The screw thread 2 is surrounded by a pipe-end protector 3 of the invention, formed by a one-piece plastics body, in particular made of a very strong and elastic polymer such as polyurethane.

Inside the body 3 a metal ring 4 is embedded consisting of a strip of an elastic metal, in particular steel, which is bent into a ring shape and is closed by welding. In the central part of said ring a hole 5 is formed in which a filling duct in the shape of a tube 6 is fixed in a suitable manner, e.g., as shown, by means of a screw connection, but instead thereof also a welding connection can be used. The free extremity of the filling duct 6 opens into a depression 7 formed in the front face of the body 3, in which a one-way valve, not shown, is provided which, when pressing thereon, is opened in order to introduce compressed air into the duct 6, and said valve can also be opened by hand in order to let the air escape from the duct 6.

At the inner side of the ring 4 an air chamber 8 is formed which, for instance as shown, can be defined by means of foil material 9 adhered to the ring 4, which foil material, as shown, can also have the shape of a hose closed in itself. Said air chamber 8 connects with the duct 6 by means of the hole 5.

The outer portion 10 of the body 3 is sufficiently thick for withstanding possibly occurring thrust forces and, thus, protecting the duct 6. At an elastic deformation of this portion 10, also the ring 4 can yield elastically. After the deforming force has terminated, the body 3 and also the ring 4 will assume again the original shape.

When, by means of the duct 6, compressed air, in particular at the pressure of about 0.9 MPa usual at bore wells, is introduced into the chamber 8, the inner portion 11 of the body 3 will be pressed against the screw thread 2 of the pipe 1 and will be firmly held thereon. When actuating the one-way valve arranged at the outer end of the duct 6, the air pressure can be relieved again, and the protector can be removed from the pipe 1.

The portion 11 of the body 3 is sufficiently strong for withstanding said internal pressure if no pipe 1 is present within the body 3.

When substantial thrust forces are exerted on the end face of the body 3, it may be possible that the body 3 will shift on the pipe 1, but the effect of the protector is not impaired thereby. The depression 7 is sufficiently deep for protecting the filling extremity of the duct 6 also in that case.

As shown the body 3 can, furthermore, be provided with an internal collar 12 for protecting the end face of the pipe 1 and preventing the latter from shifting as a consequence of thrust forces. In the case of exceptionally heavy loads said collar may, perhaps, be sheared off, but also then the effect of the protector is being maintained.

FIG. 2 shows a preferred embodiment of the protector of the invention which mainly corresponds to that of FIG. 1, and corresponding parts are indicated by the same reference numerals.

As shown in FIG. 3, the ring 4 comprises, substantially in its middle part, a circumferential outward bulge 13 in which the hole 5 is provided. The filling duct 6 is, now, a throughgoing tube which, also at the other extremity of the body 3, opens into a depression 7', and which, in the case shown, is provided at both extremities with a one-way valve 14. Said tube 6 is welded to the ring 4, a hole 5' in said tube joining the hole 5 of the ring 4. The bulge 13 is spanned by a piece of foil material 15 which is fixed on the inner wall of the ring 4 by means of a suitable adhesive.

The embodiment of FIGS. 2 and 3 has the advantage that supplying and discharging air towards or from the chamber 8 can take place at two sides of the body 3, and said embodiment has, moreover, some manufacturing advantages.

Both pipe-end protectors shown are formed in an adapted two-part casting mould, and in the case of the embodiment of FIG. 1 the tube 6 is fixed on a wall of said casting mould, whereas the tube 6 of FIG. 2 is supported at two opposite sides in said mould. The latter embodiment simplifies centering the ring 4 in the mould. This mould is, then, filled with the components of the polymer to be formed, and thereafter the polymerisation reaction is carried out. At the end thereof the mould can be opened, and the body 3, which is self-releasing, can be removed.

During the polymerisation reaction the interior of the tube 6 should be kept in communication with the ambient air, in order to prevent a pressure rise by expansion of the air enclosed thereby, which would, otherwise, lead to irregularities in the body 3.

The outer surface of the ring 4 is preferably pretreated in such a manner that it adheres well to the plastics. The inner portion of said ring should remain loose from the plastics in order to allow the air chamber 8 to be formed. In the case of FIG. 1 this is obtained by using a closed hose, but it is also possible to use a simple covering of the hole 5 by means of foil material, since, when introducing compressed air for the first time, the portion 11 will come loose from the inner surface of the ring 4. In the case of FIG. 2 the bulge forms an initial chamber, and during introduction of compressed air for the first time the foil material will be torn off the ring 4.

I claim:

1. A pipe-end protector, consisting of a plastic body provided with a bore for accommodating the pipe-end to be protected and having an interior cavity connecting by means of a filling duct with a filling connection which is accessible from the outside and is provided with a one-way valve, in order to clamp, by means of a pressure rise inside said cavity the wall of the bore of said body against the pipe-end, a metal ring preventing the outward expansion of said body, characterised in that said body (3) consists of one piece of an elastic and strong plastic material, in particular a polymeric material such as polyurethane, in that the metal ring (4) is a closed ring completely embedded in the plastic and being sufficiently flexible for following elastic deformations of the plastic body, an opening (5) formed in said ring (4), the body portion (10) outside said ring (4) having a sufficient thickness for providing an elastic thrust protection, in that the expansion cavity (8) is defined by the inner wall of said ring (4), in that the filling duct (6) is situated at the outer side of said ring (4), and communicates, through said opening (5) in said ring (4) with said cavity (8), and in that a depression (7) is formed in an end face (11) of said body (3), the filling connection for said duct (6) provided with said one-way valve (14) is situated in said depression (7).

2. The protector of claim 1, characterised in that body (3) is provided, near one end face, with an internal collar (12), with which the end face of the pipe (1) to be protected can engage and is protected thereby.

3. The protector of claim 1 or 2, characterised in that said body has an inner side and the strength of the body at said inner side (11) is sufficient for withstanding the normal filling pressure if no pipe (1) is present inside the bore of said body (3).

4. The protector of claim 1 or 2, characterised in that said body (3) has two end faces and the filling duct (6) is a tube extending between both said end faces, said tube being welded to the metal ring (4), and communicating with the opening (5) in said ring (4) by means of a transverse bore (5').

5. The protector of claim 4, characterised in that the tube (6) is a throughgoing tube which is provided, at both extremities, with a filling connection with said one-way valve (14).

6. The protector of claim 1 or claim 2, characterised in that the metal ring (4) is provided with a circumferential bulge (13) in which the opening (5) communicating with the filling duct (6) is situated.

7. The protector of claim 1 or claim 2 characterised in that the plastic material of the body (3) is adhered to the outer wall of said ring (4).

* * * * *